United States Patent [19]

LaSalle

[11] Patent Number: 5,377,539
[45] Date of Patent: Jan. 3, 1995

[54] VALVE STEM EXTENDER WITH INTEGRAL AIR PRESSURE GAUGE

[76] Inventor: Robert LaSalle, 3337 Canada Goose Crossing, Racine, Wis. 53403

[21] Appl. No.: 51,890

[22] Filed: Apr. 26, 1993

[51] Int. Cl.[6] ............................................. B60C 23/04
[52] U.S. Cl. ...................................... 73/146.8; 73/743
[58] Field of Search ...................... 73/146.8, 743, 741, 73/732

[56] References Cited

U.S. PATENT DOCUMENTS

| | | | |
|---|---|---|---|
| 1,855,088 | 4/1932 | Boenkef et al. | 73/146.8 |
| 1,893,222 | 1/1933 | Bronson | 73/146.8 |
| 3,969,936 | 7/1976 | Lindsay | 73/146.8 |
| 4,667,517 | 5/1987 | Holden | 73/743 |
| 4,924,697 | 5/1990 | Hunt | 73/146.8 |

*Primary Examiner*—Richard E. Chilcot, Jr.
*Assistant Examiner*—Joseph L. Felber
*Attorney, Agent, or Firm*—Keith Schoff

[57] ABSTRACT

An air pressure gauge is provided integrally with a valve stem extender as used with automotive vehicle wheels mounting tubeless or tube-type air inflated tires. The gauge comprises a Bourdon tube concentrically coiled about the barrel of the valve stem extender and communicated to the interior of the barrel through an orifice provided in the wall of the barrel. The Bourdon tube carries a dial pointer at its outer end which registers with a stationary dial face bearing visible indicia indicating tire inflation pressure. An annular viewing crystal is provided over the pointer and dial face. The gauge displays air inflation pressure reading constantly and need not be disturbed while air is being added to a tire.

2 Claims, 2 Drawing Sheets

VALVE STEM EXTENDER WITH INTEGRAL AIR PRESSURE GAUGE

FIELD OF INVENTION

Wheel-mounted air inflated tires are used universally for vehicles of all kinds and particularly for automotive vehicles. Proper tire inflation pressure is an important consideration for tire life and safety.

PRIOR ART

Air valve stems with integral air pressure gauges are disclosed in U.S. Pat. Nos. 5,103,670, 4,310,014, and 4,793,177. Means with liquid crystal color display is disclosed in U.S. Pat. No. 4,426,881.

Air valve caps with integral pressure gauges are disclosed in U.S. Pat. Nos. 3,799,037, 4,924,697.

An automotive wheel cover with integral tire inflation air pressure gauge is disclosed in U.S. Pat. No. 5,100,206.

SUMMARY OF THE INVENTION

A valve stem extender as commonly used with air-inflated tire valve stems mounted on automotive wheels having decorative wheel covers or which comprise the inner wheel of dual wheel sets on trucks, is provided with an integral air pressure gauge which displays air inflation pressure constantly. Tire inflation condition can be monitored by passive viewing and air can be added to a tire without disturbing gauge operation.

Preferably, a Bourdon tube element is mounted on a valve stem extender in concentrically coiled disposition with the hollow core of the tube being communicated through an orifice in the wall of the valve stem extender to the interior passage through which pressurized air is delivered to a tire. The inner end of the tube is soldered to the barrel of the valve stem extender around the orifice, and the outer end of the tube is sealed closed with the distal extremity being bent upward and radially inward to provide a pointer traversed arcuately in response to varying pressures in the Bourdon tube.

DESCRIPTION OF THE INVENTION

Figure 1:
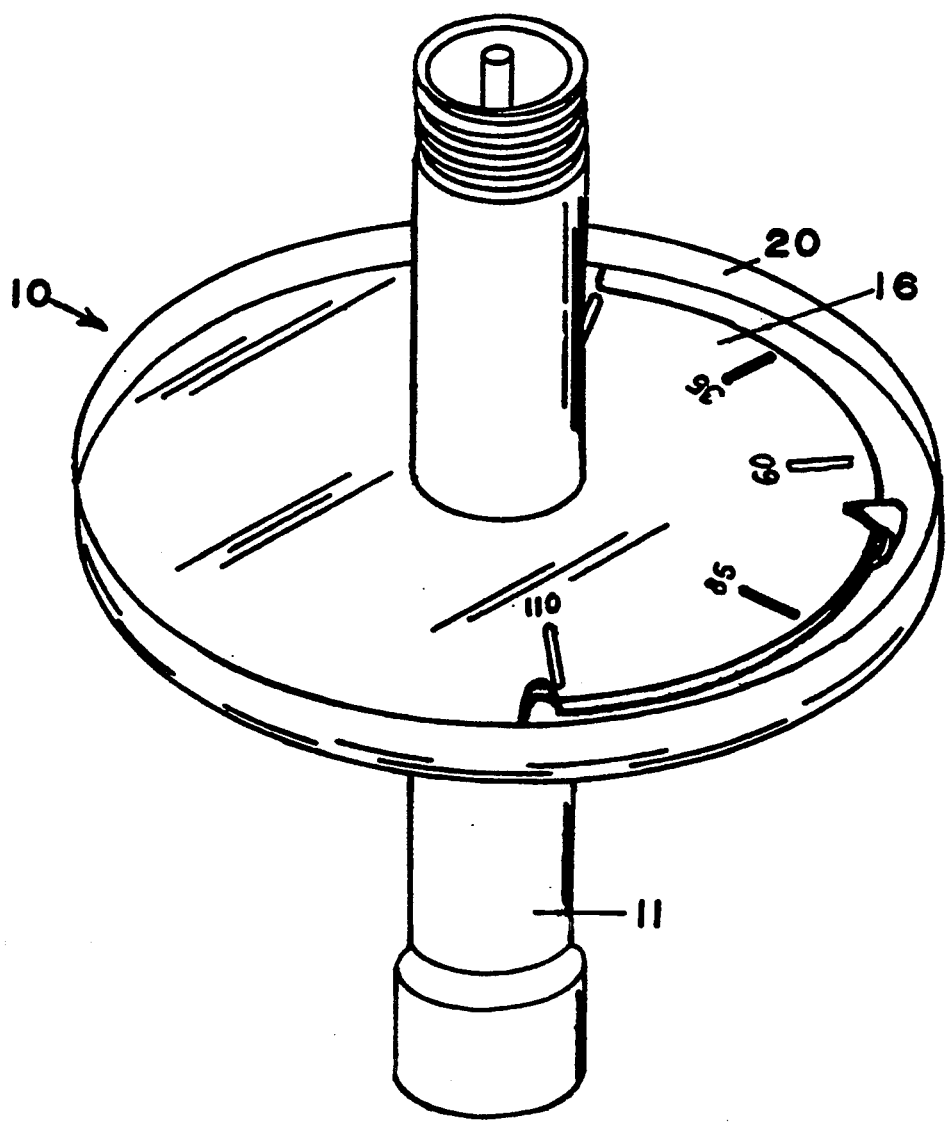
FIG. 1 is a perspective view of a preferred embodiment of the invention showing an air pressure gauge integral with a valve stem extender.
Figure 2:
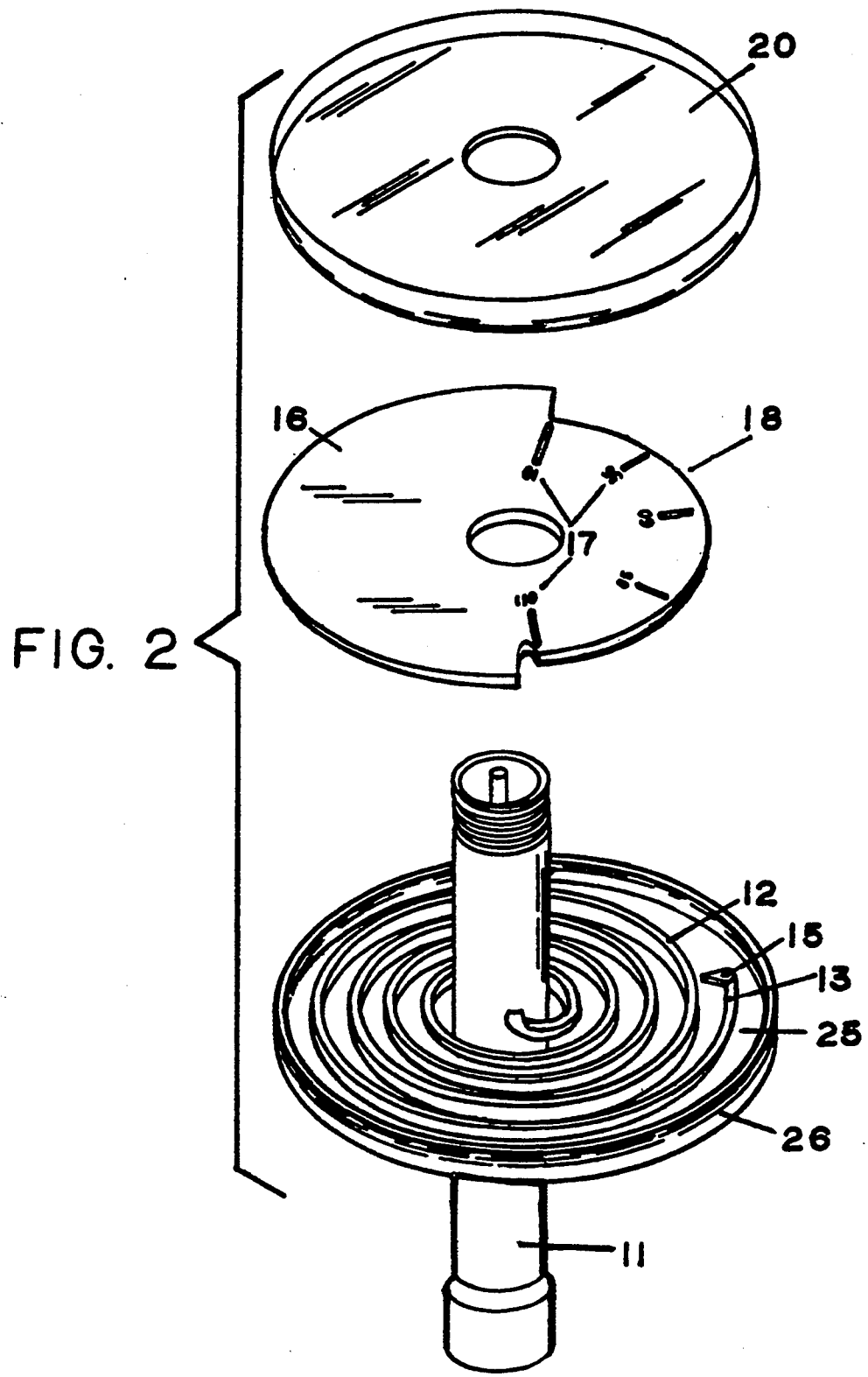
FIG. 2 is an exploded perspective view of the embodiment of FIG. 1.

In FIGS. 1 and 2, air pressure gauge 10 is shown comprising conventional valve stem extender 11 of any operable construction, such means being commonly utilized in conjunction with air inflated tires of automotive vehicles for rendering a valve stem accessible for adding inflation air to a tire. Common to all such means are internal threads provided at the base end of a tubular body for screwing the device only the top of a wheel or tire-innertube mounted valve stem, and external threads at the opposite end for receiving a dust cap, although the latter feature may be eliminated. A fixed axially disposed post is provided at the base end for contacting and depressing a spring loaded valve core member disposed in the valve stem to which the extender is attached, and a similar valve core is threadedly engaged in the barrel of the valve stem extender for being depressed and opened by engagement of a compressed air hose fitting with the top of the valve stem extender. The foregoing description of a valve stem extender comprises no part of this invention.

Bourdon tube 12 is configured as a spiral coil disposed concentrically around valve stem extender 11. The inner end of Bourdon tube 12 is fixed in a sealed connection around an orifice, hidden from view, in the wall of valve stem extender 11, preferably by silver soldering or other fusion process. The connection communicates an air passage through the barrel of valve stem extender 11 with the hollow interior core of the flattened tubular cross-section configured Bourdon tube 12. Distal end portion 13 of Bourdon tube 12 is sealed closed with the end extremity being fashioned into the configuration of a pointer arrow, and is disposed through a radiused reverse bend to extend radially inward toward valve stem extender 11 to form pointer 15. Bourdon tube 12 exhibits the characteristic property of coiling more tightly or uncoiling more loosely in response to air pressure condition within the core of the tube so that pointer 15 traverses an arc extending from one end of the indicia scale shown to the other in sensing ambient atmospheric pressure to maximum tire inflation pressure.

Annular disk 16 bearing reflective indicia 17 is configured with arcuate notch 18 through which pointer 15 operably extends. Pointer 15 registers with indicia spaced to form a dial face scaled on disk 16 and marked with numerical values indicating pressure readings. Disk 16 is placed to cover the coils of Bourdon tube 12 with pointer 15 extending through notch 18 so that the dial face and pointer are visible through transport crystal 20 which overlies and sealably encloses the annular assembly of Bourdon tube 12 and disk 16. Viewing crystal is shown configured with a cylindrical side wall for enabling hemispherical wide-angle viewing to be made of indicia 17.

Annular base 25 of gauge 10 preferably comprises a metal cup configuration with an inner periphery which can be operably soldered to the wall of valve stem extender 11 to provide a seal, and with an upstanding outer peripheral rim portion 26 of which the side wall edge extremity into crystal 20 is received. Rim portion 26 is crimped about the edge of crystal 20 to operably seal and provide an airtight enclosure for gauge 10. Calibration of the gauge is preferably accomplished prior to sealing crystal 20 to base 25, however, if desired, disk 16 can be adhered to crystal 20 by use of adhesive or other operable means, and the seal made between crystal 20 and base 25 be such as to enable sliding movement to be made between the two components for enabling calibration or re-calibration to be made at any time. Such a seal might comprise a sealant film or layer between the components. As conventional for such instruments, a safety break-away feature is desirably provided to prevent uncontrolled shattering of crystal 20 in the event that high pressure air leaks into the gauge enclosure.

The inner peripheral edge of crystal 20 is sealed to the wall of valve stem extender 11 in operable manner, preferably by use of adhesive. A dust cap can be received on the upper end of valve stem extender 11 in usual manner and air may be added to a tire through valve stem extender 11 in ordinary manner without disturbing gauge 10.

It will be apparent to persons skilled in the art that the arrangement of gauge 10 on valve stem extender 11 can be altered, or that materials of construction can be altered, or that the configuration of valve stem extender can be curvilinear rather than straight, but such alterations and modifications are within the scope of this invention.

I claim:

1. A continuous display, pressure gauge for use with air inflated automotive tires comprising
   a) an elongated, air inflated tire valve stem extender portion embodying a spring loaded air valve controlling air flow in a passage extending longitudinally through said extender portion, said extender portion being configured for being operably received on a valve stem of a tire at a base end extremity, and for receiving thereon a pressurized air hose fitting at the opposite free-end extremity,
   b) an opening disposed through the wall of said valve stem extender portion,
   c) a Bourdon tube operably disposed, sealably connected to the outer surface of said valve stem extender portion for communicating said opening through said wall to the inner end extremity core opening of said Bourdon tube to provide for flow of air between said passage in said valve stem extender portion and said core of said Bourdon tube, wherein said Bourdon tube is configured as a substantially flat spiral coil disposed annularly around said valve stem extender portion substantially axially concentric therewith,
   d) a dial pointer distal end configuration of said Bourdon tube,
   e) a sealed annular enclosure having disposed therein said Bourdon tube and said dial pointer distal end configuration wherein said enclosure is provided with a transparent viewing face,
   f) an indicia disk disposed within said enclosure in fixed relation thereto including a dial scale with which said dial pointer end configuration operably registers to indicate air inflation pressure within said valve stem extender portion and of a tire with which it is used.

2. The gauge of claim 1 wherein said valve stem extender portion and said enclosure are disposed coaxially, with said enclosure being annularly configured and said valve stem extender portion projecting axially from said annular enclosure with a free end thereof being rendered accessible for making connection to a pressurized air hose in a position which renders said indicia visible to a person manipulating said air hose to make such connection.

* * * * *